(12) United States Patent  
Justin (10) Patent No.: US 6,514,371 B2
(45) Date of Patent: Feb. 4, 2003

(54) METHOD AND APPARATUS FOR APPLYING ADHESIVE FILM TO AN ARTICLE

(76) Inventor: Louis K. Justin, 10778 W. Braemar Dr., Holly, MI (US) 48442

( * ) Notice: Subject to any disclaimer, the term of this patent is extended or adjusted under 35 U.S.C. 154(b) by 0 days.

(21) Appl. No.: 09/804,870

(22) Filed: Mar. 13, 2001

(65) Prior Publication Data

US 2001/0035258 A1 Nov. 1, 2001

Related U.S. Application Data

(60) Provisional application No. 60/188,740, filed on Mar. 13, 2000.

(51) Int. Cl.[7] .............................. B32B 31/20; B23Q 3/06
(52) U.S. Cl. ..................... 156/229; 156/494; 269/97; 269/152
(58) Field of Search ........................... 156/64, 71, 108, 156/160, 161, 212, 229, 250, 289, 306.3, 308.2, 312, 313, 324.4, 358, 367, 391, 475, 477.1, 494, 496, 536, 580; 269/1, 152, 97, 47

(56) References Cited

U.S. PATENT DOCUMENTS 4,708,760 A    11/1987  Mark et al.
4,769,100 A *  9/1988  Short et al. ................. 156/212
5,399,393 A    3/1995   Zoller
5,415,554 A    5/1995   Kempkers et al.
5,965,083 A    10/1999  Reichenberger
5,968,614 A    10/1999  Reichenberger
6,001,198 A    12/1999  Habisreitinger

FOREIGN PATENT DOCUMENTS

WO    WO 9943909 A1 *  9/1999  ............. E04C/5/07

* cited by examiner

*Primary Examiner*—Richard Crispino
*Assistant Examiner*—Sing P. Chan
(74) *Attorney, Agent, or Firm*—Brooks & Kushman P.C.

(57) ABSTRACT

A method and apparatus for applying adhesive film to an article. Clamps are mounted on a fixture for temporarily securing the fixture to the article. Film locator clips are mounted on the fixture to receive a segment of adhesive film. At least one of the film locator clips is moveable and biased in one direction to apply tensioning force to the film to hold at least a part of the film in a spaced relationship to the vehicle. A wiping head on the fixture is shifted to engage the film and cause one portion of the film to be applied to the vehicle. The wiping head is then moved from the one portion of the film to other portions of the film to apply the other portions of the film to the article.

22 Claims, 7 Drawing Sheets

METHOD AND APPARATUS FOR APPLYING ADHESIVE FILM TO AN ARTICLE

CROSS-REFERENCE TO RELATED APPLICATIONS

This application claims the benefit of U.S. provisional application Ser. No. 60/188,740 filed Mar. 13, 2000.

TECHNICAL FIELD

The present invention relates to a method and apparatus for applying adhesive film to an article.

BACKGROUND ART

Decorative films are used in the manufacture of vehicles and other consumer products to provide a second "paint" color, product identification, product operation instructions, or control panel indicia. By using decorative films, multiple decorative painting processes can be eliminated while providing high quality and durable graphics. Generally, decorative films are manually applied. Adhesive protective layers must be removed from the decorative film and the film must be carefully and evenly applied without wrinkles or misalignment. Considerable skill may be required to apply a relative large section of film to an article because while one end of the film is being applied the other end must be held away from the article so that inadvertent contact of the film adhesive does not cause the film to be applied improperly.

In the manufacture of vehicles decorative films have increasingly been used to provide decoration without additional paint processing operations. Sport utility vehicles, mini-vans and other vehicles use adhesive film to cover portions of body panels between windows to create a continuous wrap around window appearance. Generally, glossy black film is applied to door frames or body pillar surfaces that are visible from the exterior of the vehicle. Due to problems encountered in applying film on an assembly line it had been proposed to provide molded plastic trim pieces instead of film to cover body parts between windows. The use of molded plastic trim pieces adds weight and unnecessarily increases costs.

Decorative films are applied in automotive manufacturing facilities after the vehicle painting operations are completed but before installation of window trim and assembly of window and door seals. It may take as many as three or four workers to apply film to both sides of the vehicle. The prior art method of applying decorative film to a door frame was accomplished by several workers using a simple fixture to hold the film over the location where it is to be applied. Workers then work with a brush or other wiping tool to smooth the adhesive film onto the article. One problem with this approach is variability in locating the film on the article and a tendency of the film to adhere in the wrong location causing wrinkles in the finished product. If the film is misapplied or is applied with wrinkles, it is necessary to remove the film and apply another section of film. To do so, window trim, window seals, and door seals must be removed and reassembled.

Automotive manufacturers use decorative film (or tape) to pin stripe, apply a model name or brand designation or for a special "paint" details on limited edition models, and the like. An effective, repeatable process and fixture for applying such decorative media to a vehicle is needed. In addition, a method and fixture for applying control panel decoration for washers, dryers, and other consumer products is needed. These and other problems and obstacles to prior art methods and devices are addressed by applicant's invention as summarized below.

DISCLOSURE OF INVENTION

It is a principal object of the present invention to provide a simple and effective method and apparatus for applying film, tape "chrome" trim pieces, plastic guards and other pressure sensitive adhesive bearing media to articles. To be acceptable, the method and apparatus must be capable of applying films, tapes and other pressure sensitive adhesive applied media with high standards of repeatability and a minimal scrap rate.

According to the invention, an apparatus is provided for applying an adhesive film to an article. The apparatus includes a fixture on which at least one clamp is mounted for temporarily securing the fixture to the article at a predetermined location on the article. First and second film locator clips are mounted on the fixture and the adhesive film is attached to the film locator clips. At least one of the film locator clips is biased in one direction to apply tensioning force to the film to initially hold at least part of the film in a spaced relationship to the article. A wiping head is mounted for movement relative to the fixture and is shifted to engage the film and cause one portion of the film to be applied to the article. The wiping head then moves from that one portion of the film to another portion of the film to apply the other portion of the film to the article.

According to the invention the article may be a vehicle and a plurality of clamps may be provided that engage at least two structural edges of a body part of the vehicle to locate the fixture relative to the body part prior to applying film to the vehicle. For example, the body part may be a vehicle door and the plurality of clamps may be arranged in two sets with one set of claims engaging the B pillar of the door and the other set of clamps engaging in the top and bottom sills of a window opening formed in the door.

According to other aspects of the invention relating to the film locator clips, one of the film locator clips may be used to hold the first part of the film stationary as the film is applied to the vehicle. The second film locator clip is then movable in response to the wiping head moving from one portion of the film to another portion of the film while the second film locator clip holds a second part of the film. The second film locator clip, if movable, may use at least one air pressure biasing member and a source of air pressure that provides the biasing force. The air pressure biasing member may be a pair of piston pins disposed within a housing having a pair of bores that partially receive the pair of piston pins.

The wiping head made according to the present invention may be mounted on a carriage. The carriage moves along a track aligned with the direction that the carriage moves on the track. The wiping head may be secured to a cylinder drive mechanism that shifts the wiping head to engage the film and press the film in to engagement with the vehicle. The wiping head is generally moved normal to the surface of the vehicle to which the film is applied.

According to the method of the present invention, decorative film having a adhesive coating on one side is applied to an article in a predetermined location on a surface. The steps of the method include locating the fixture, such as the fixture described above, on the article. A film segment is attached to first and second clips at spaced locations. A biasing force is applied to the film segment that causes tension to be applied to the film by the first and second clips for the purpose of preventing the film from sagging toward the article. A wiper is moved in a first direction into the film to cause a first portion of the film to contact the article and cause the adhesive to adhere the first portion of the film to the article. The wiper is then moved in a second direction along the film segment to cause additional portions of the film to progressively contact the article and cause the adhesive to adhere additional of portions of film to the article.

According to the invention as it relates to the application of a biasing force to the film segment, the biasing force may be provided by a second clip that applies a dynamic force on the segment by pulling on one end of the film segment. The step of applying a biasing force may be performed by providing a slide that moves the second clip. The slide is preferably attached to a track that is attached to the fixture. Alternatively, the biasing force could be applied by a rotatable member. The biasing force may be developed by either a air spring or a solid spring element operating between the track and the slide.

The present invention also relates to the clamping mechanism for locating the fixture on the article. Generally, opposed clamping members are used to locate the fixture on an article. The clamping members clamp the fixture to the article in alignment with a reference line on the article that defines the predetermined location where the film is to be applied. Solid clamps, vacuum cups or other clamping apparatus can be used in accordance with the invention.

According to another aspect of the invention the wiper that applies the film to the article is moved in a first direction by means of a linear motor mounted on the fixture that advances and retracts relative to the film. The linear motor may incorporate an air cylinder, a hydraulic cylinder or a rack and pinon gear set.

According to another aspect of the method of the present invention, the film is held between the first and second clips and is initially bent into an oblique angular orientation when the wiper initially causes the film to contact the article. The wiper establishes a line of contact between the article and the film. As the wiper moves toward the second clip and away from the first clip to cause additional portions of the film to adhere to the article, the wiper maintains a line of contact with the article. The angle of the unapplied film at the line of contact relative to the surface increases as the wiper advances in the second direction.

The above aspects and advantages of the present invention are described more specifically with reference to the attached drawings of the invention and is described in detail below.

BRIEF DESCRIPTION OF DRAWINGS

FIGS. 12 a–d show the second film retention clip including the piston pin biasing mechanisms.

BEST MODE FOR CARRYING OUT THE INVENTION

Figure 1:
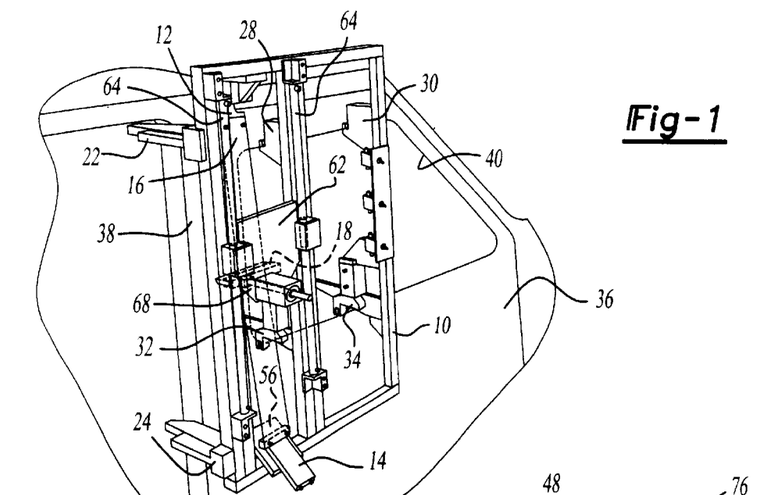
FIG. 1 is a perspective view of an apparatus for applying adhesive film to an article in accordance with the present invention shown attached to a vehicle door.
Figure 2:
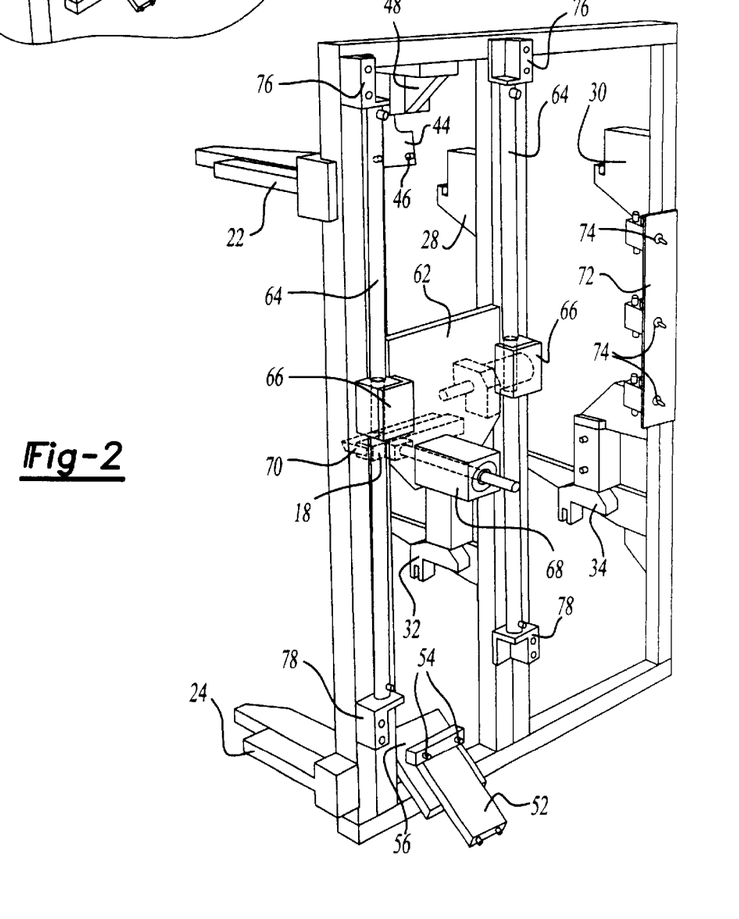
FIG. 2 is a perspective view of the apparatus for applying adhesive film to an article.

Referring now to FIGS. 1 and 2, a fixture 10 for applying adhesive film, adhesive tape or other decorative media (hereinafter "adhesive film") having pressure sensitive adhesive to an article is shown. A first film locator clip 12 is secured to the fixture and a second film locator clip 14 is secured to the fixture 10 at a spaced location relative to the first film locator clip 12. A segment of adhesive film 16 is initially connected between first and second film locator clips 12,14 and a wiping head 18 is also provided on the fixture 10 as will be more specifically described below.

The fixture 10 is clamped to an article. Various clamping mechanisms can be used including opposing clamp and edge locators, 90° linkage clamps, rack and pinion clamps, or vacuum cup type clamps. Various clamp and holding mechanisms can be used. In the illustrated embodiment, first and second static horizontal clamp elements 22, 24 and an opposing dynamic horizontal clamp element 26 are utilized. When the dynamic horizontal clamp element 26 is actuated, it engages an opposing surface or edge to the surface or edge engaged by the first and second static horizontal clamp elements 22,24 to provide a three-point locating system that locates the fixture 10 in the horizontal direction. First and second static vertical clamp elements 28,30 are provided in a fixed location on the fixture 10, while first and second dynamic vertical clamp elements 32,34 engage in an opposing surface relative to the first and second static vertical clamp elements 28, 30. The static and dynamic vertical clamp elements 28–34 locate the fixture 10 in a vertical direction. In the illustrated embodiment, the vehicle door 36 is the article to be decorated by the segment of adhesive film 16. The portion of the vehicle door 36 that is to be decorated in the illustrated embodiment is the B-pillar 38 of the vehicle door 36. The clamping system utilizes the window frame 40 of vehicle door 36 with the vertical clamp elements engaging the upper and lower portions of the window frame 40 while the horizontal clamp elements engage opposite sides of the B pillar of the door 38. It should be readily appreciated that the present invention is not limited to application film to vehicles or to any particular part of a vehicle. A different clamping system could be used, for example, to apply a vehicle model designation to a quarter panel, door, tailgate, or any other portion of a vehicle. The present invention could also be used to apply pinstriping across the top or sides of the vehicle utilizing appropriate clamping or other locating devices.

The first film locator clip 12 includes a plate 44 to which two pins 46 are secured. The pins 46 are received by holes in the segment of adhesive film 16 to hold one end of the adhesive film 16 prior to and during the film application process. An angle bracket 48 is provided to secure the first film locator clip 12 in a stationary relationship on the fixture 10. While in a preferred embodiment, the first film locator clip 12 is stationary, it is conceivable that the first film locator clip could be a movable or dynamic member.

Figure 9:
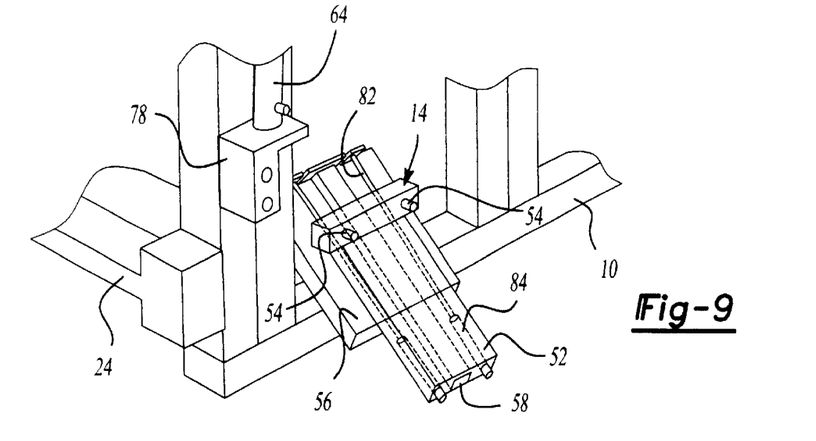
FIG. 9 is a fragmentary perspective view of an air spring or piston pin type biasing mechanism for the second film locator clip.

The second film locator clip 14 includes a moveable plate 52 to which two pins 54 are attached. The pins 54 are received in openings or holes in the segment of adhesive film 16. A bracket 56 secures the second film locator clip 14 to the fixture 10. Referring to FIG. 9, a track 58 is provided between the moveable plate 52 and bracket 56 to guide movement of the moveable plate 52 relative to the bracket 56. In the disclosed embodiment, plate 52 is moveable, however, it should be understood that the first film locator clip 12 could be moveable while the second film locator clip 14 could be static. Alternatively, both the first and second film locator clips 12,14 could be dynamically mounted.

Referring back to FIGS. 1 and 2, the wiping head 18 is retained and moved by a carriage 62. Carriage 62 rides on parallel linear actuators 64. Connectors 66 connect the carriage 62 to the linear actuators 64. The wiping head 18 is moved by means of a cylinder drive 68 to cause a wiper 70 mounted on the wiping head 18 to contact the segment of adhesive film 16. The linear actuator 64 is preferably a rodless air cylinder linear actuator. However, the linear actuators 64 could be of the rack and pinion drive, screw drive, or belt drive type, without departing from the spirit and scope of the present invention. The cylinder drive 68 is preferably a air cylinder, however, a hydraulic cylinder, a dual rod cylinder, a linkage, or cam pressure applicating mechanism could be used.

The connectors 66 are preferably cam rollers but could also be a shaft slide, or other linear motion bearings that cooperate with the linear actuator 64.

As shown in FIGS. 1 and 2, a simple control panel 72 may be provided with switches 74 that are used to control the horizontal and vertical dynamic clamps and the wiping head 18.

The movement of the carriage 62 is limited by upper and lower end stops 76,78 that provide positive stops that limit movement of the carriage 62.

Figure 3:
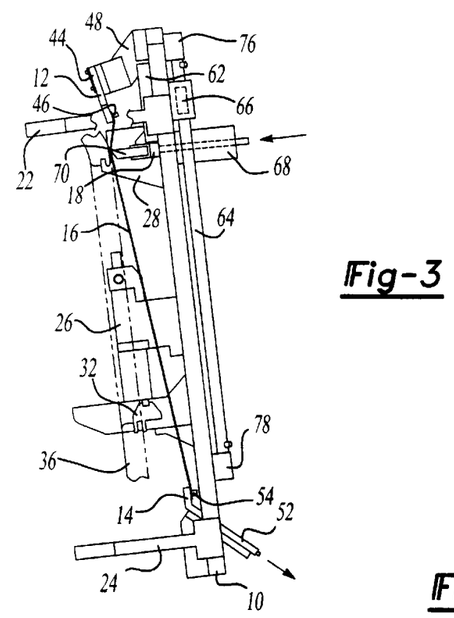
FIG. 3 is a rear elevation view of the apparatus for applying adhesive film to an article at the point in the film application cycle when the wiper initially contacts the film.
Figure 4:
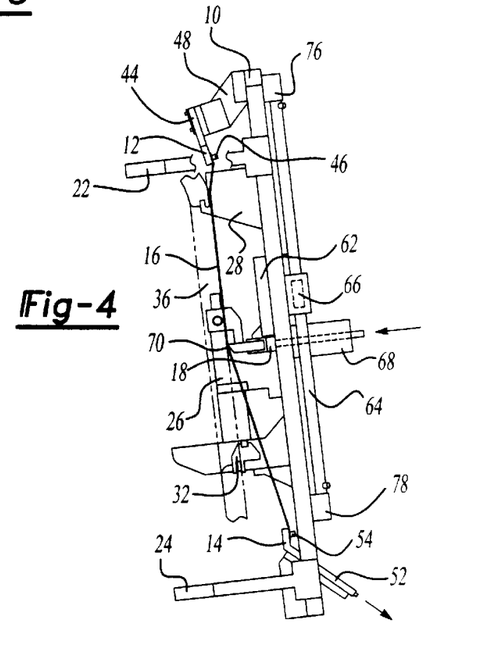
FIG. 4 is a rear elevation view of the apparatus for applying adhesive film to an article at the point in the cycle wherein the adhesive film is half adhered to the article.
Figure 5:
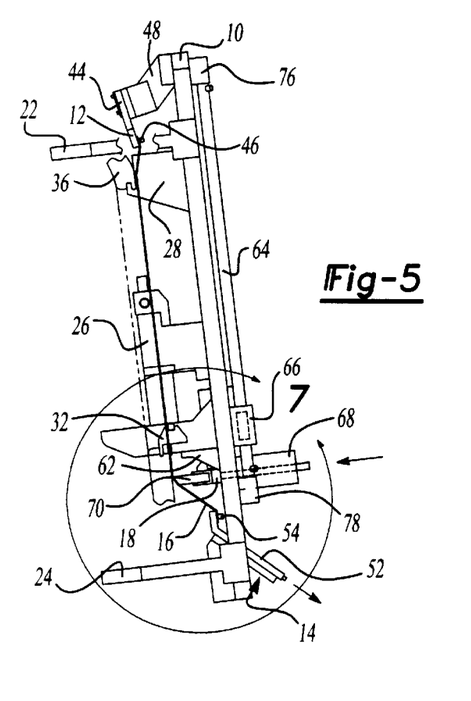
FIG. 5 is a rear elevation view of the apparatus for applying adhesive film to an article at the point in the cycle where the adhesive film has been substantially completely secured to the article.

Referring now to FIGS. 3–5, operation of the film applicating mechanism of the present invention is described in FIG. 3 at the point of the cycle wherein the wiping head 18 engages a segment of adhesive film 16 to initially secure the film to the B pillar 38 of the vehicle door 36. In FIG. 4, the wiping head is shown mid-cycle with the segment of adhesive film 16 being half applied and half unapplied to the B pillar 38. In FIG. 5, the wiping head 18 is shown at the end of the film application cycle with the segment of adhesive film 16 being fully applied to the B-pillar 38.

The cycle is started by installing the segment of adhesive film 16 between the first and second film locator clips 12, 14 by securing ends of the segment adhesive film 16 between the pins 46, 54. The segment of adhesive film 16 is preferably a multi-layer structure including the film, an adhesive backing protective layer, and a film outer surface protector that protects the decorative surface of the film from marring or scratching prior to application. The protective layer of the film is stripped from the adhesive on the film prior to beginning the installation operation. After the film 16 has been applied to the B-pillar 38, the portions of the segment of adhesive film that were secured to the first and second film locator clips 12 and 14 are discarded along with the outer protective layer leaving the segment of adhesive film 16 applied to the B-pillar 38.

One of the problems solved by the invention is that upon removal of the adhesive protective layer, the film segment tends to sag toward the vehicle. By using a moveable second film locator clip 14 that is biased away from the first film locator clip 12, tension can be applied to the segment of adhesive film 16 to keep it away from the article to which the adhesive film is to be applied. The wiping head 18 is then moved by the cylinder drive 68 to cause the wiper 70 carried by the wiper head 18 to engage the segment of adhesive film 16 causing the pressure sensitive adhesive on one side of the film to bond to the B pillar 38. The wiping head 18 may be pivotally mounted to the cylinder drive 68 to allow the wiper 70 to make good contact across the width of the segment of adhesive film 16. After the wiper 70 contacts the adhesive film 16, the linear actuators 64 cause the carriage 62 to begin moving downwardly, as shown in sequence in FIGS. 3–5, establishing a line of contact where the adhesive film 16 is pressed onto the B-pillar 38. The film 16 initially forms a relatively oblique angle that becomes progressively more acute as the carriage 62 moves the wiper 70 toward the second film locator clip 14.

In the disclosed embodiment, two pins are used on each of the first and second film locators 12,14, however, it should be understood that one or more pins could be provided or, instead of pins, a rough locator, pressure foot or surface locator could be provided on the first and second film locator clips 12,14.

With continuing reference to FIGS. 3–5, the arrow adjacent the second film locator clip 14 indicates the direction biasing forces are applied by the second locator clip 14. The arrow adjacent a cylinder drive 68 indicates the direction that the cylinder drives the wiping head 18 to engage the segment of adhesive film 16.

Figure 6:
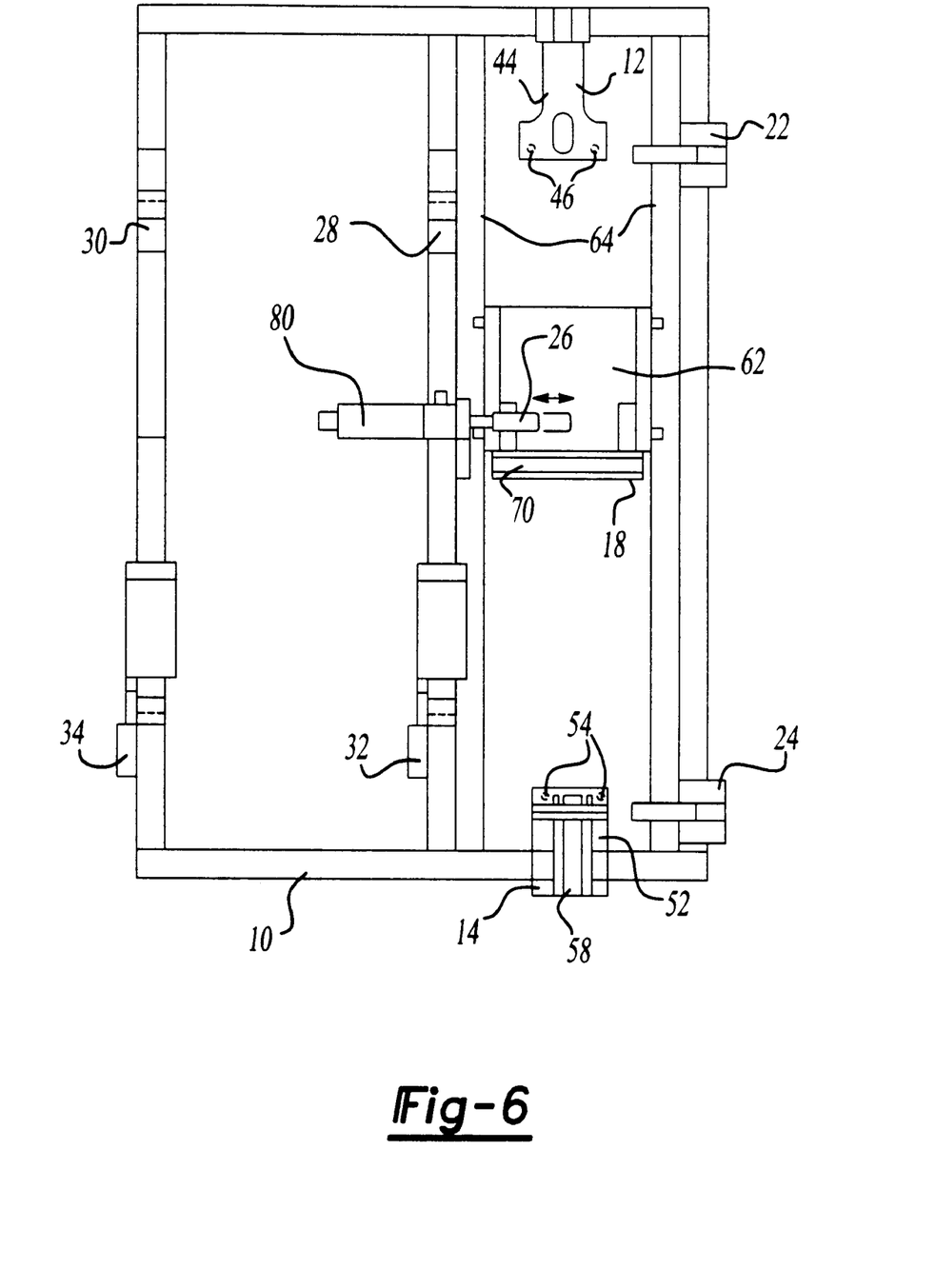
FIG. 6 is a side elevation view of the apparatus for applying adhesive film to an article.

Referring now to FIGS. 6, the fixture 10 is shown as would appear from the point of view of the object to be decorated. In this view, the dynamic horizontal clamp element 26 is shown with a bi-directional arrow indicating the direction of movement of the dynamic horizontal clamp element 26. When the cylinder 80 is extended, the dynamic horizontal clamp element 26 moves toward one side of the B pillar 38 while the first and second static horizontal clamp elements 22 and 24 engage the opposite side of the B pillar 38. Similarly, cylinders form part of the first and second vertical clamps 32,34 that engage the lower edge of the window frame 40 while the first and second static vertical clamp elements 28,30 engage the upper edge of the window frame 40. The wiper 70 is shown as it is supported by the wiping head 18, which is in turn carried by the carriage 62 and is moved by the linear actuators 64.

Figure 7:
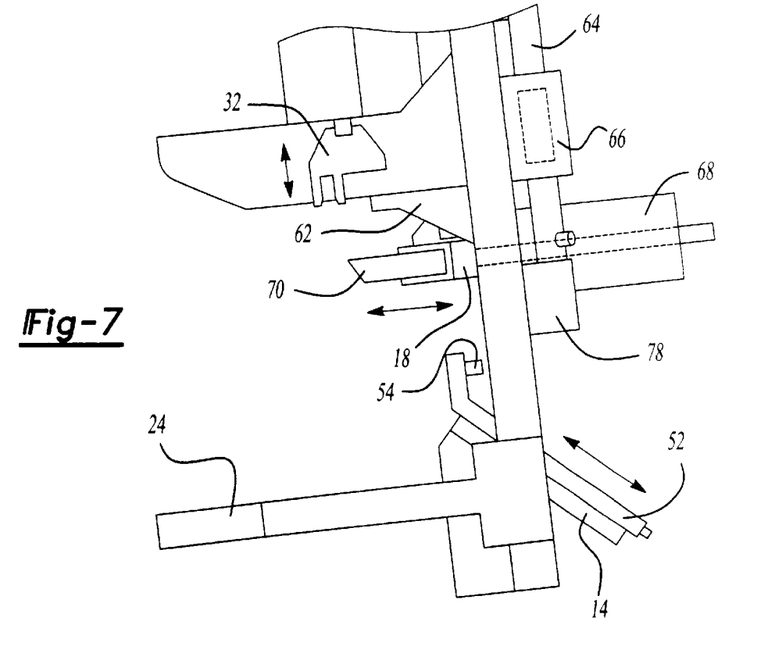
FIG. 7 is a fragmentary view corresponding to circle 7 in FIG. 5.
Figure 8:
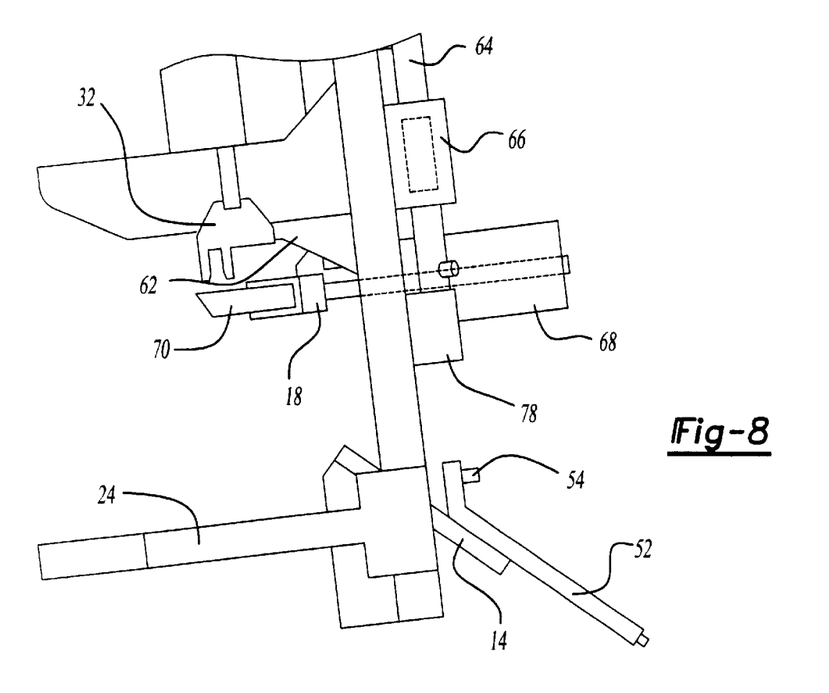
FIG. 8 is a view similar to FIG. 7 showing the second film locator clip in its fully extended position.

Referring now to FIGS. 7 and 8, the second film locator clip 14 is shown in greater detail wherein the bi-directional arrow shows the direction that the moveable plate 52 is moveable. The moveable plate 52 is shown at its maximum inward position in FIG. 7 and at its maximum extension position in FIG. 8. The wiping head 18 is shown in its maximum retracted position in FIG. 7 and its extended position in FIG. 8. The cylinder drive 68 is bi-directional and moves the wiping head 18 carrying the wiper 70 between the position shown in FIG. 7 and FIG. 8.

Referring now to FIG. 9, a preferred embodiment of the present invention is shown wherein piston pins 82 are provided in a chamber 84 that is charged by compressed air to provide between 2 and 20 pounds of pressure that biases the moveable plate 52 causing the segment of adhesive film 16 to be placed under tension as it is pulled away from the first film locator clip 12.

Figure 10:
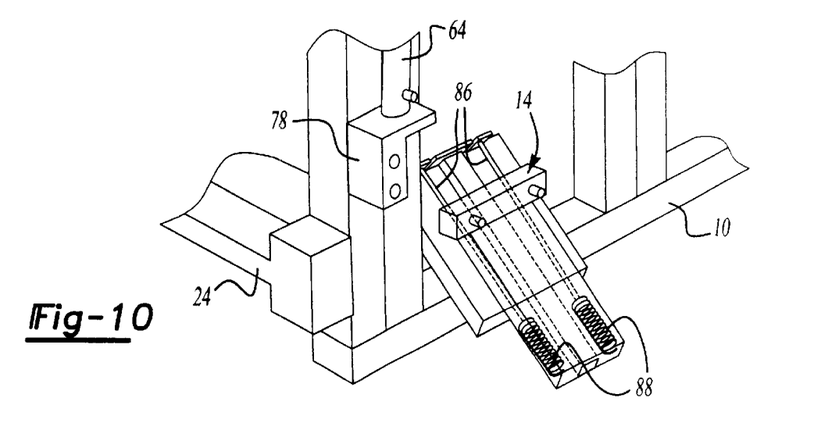
FIG. 10 is a fragmentary perspective view of a spring biasing mechanism for the second film locator clip.

Referring now to FIG. 10, an alternative embodiment of the second film locator clip 14 is shown wherein pins 86 are biased by springs 88 to exert the biasing force on the segment of adhesive film 16.

Figure 11:
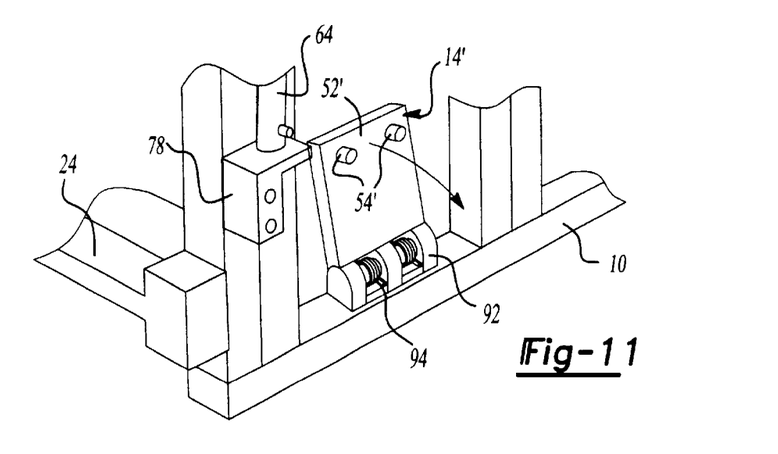
FIG. 11 is a fragmentary perspective view of a rotational spring biasing force application mechanism for the second film locator clip.
Figure 12A:
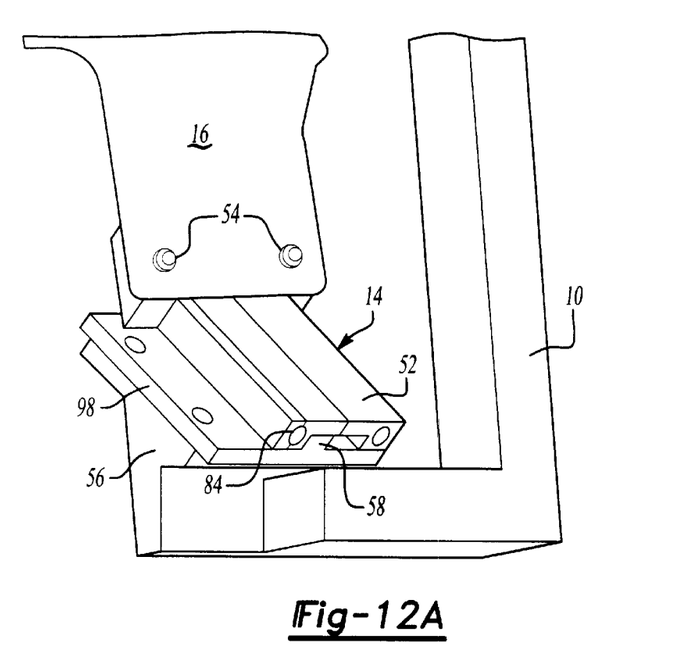
Figure 12B:
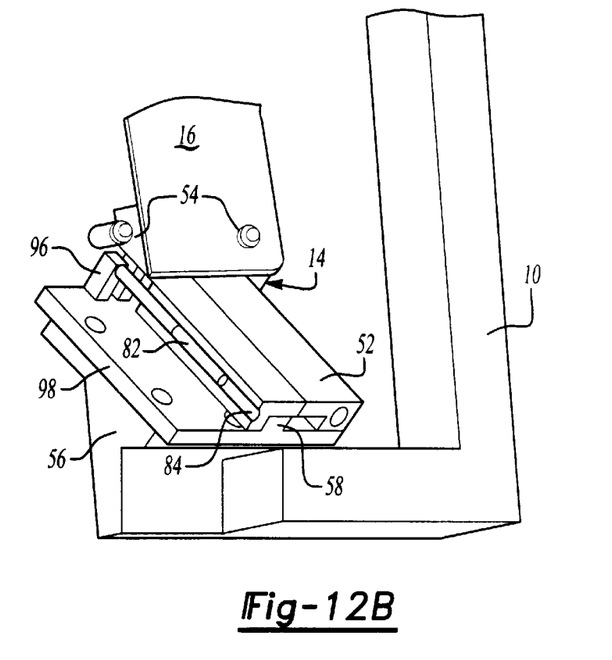
Figure 12C:
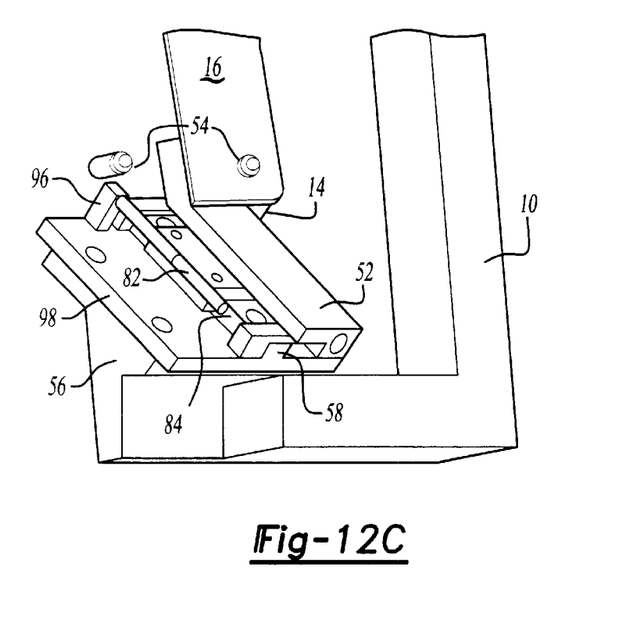
Figure 12D:
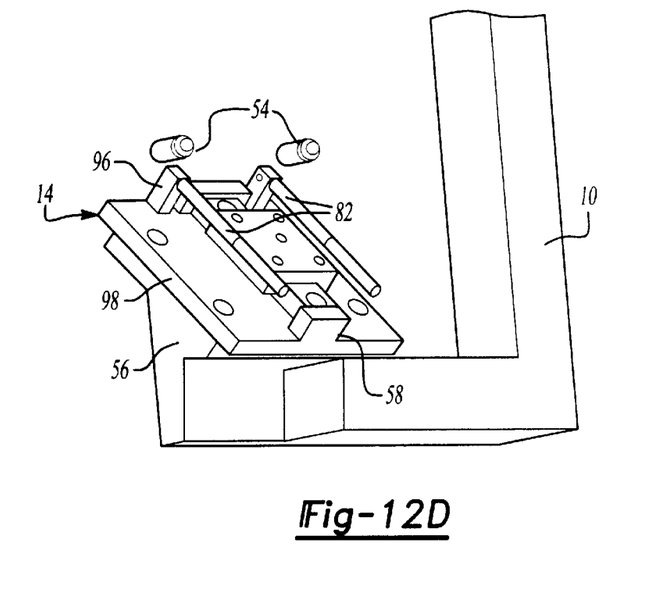

Referring now to FIG. 11, a pivot bracket 92 is provided with springs 94 that exert a rotational biasing force causing the moveable plate 52' to move in the direction shown by the arcuate arrow in FIG. 11. Pins 54' are provided on the plate 62' for securing the film 16 to the second film locator clip 14'. It is appreciated from FIGS. 9–11 that either a linear tensioning slide or rotary tensioning member can be used to provide the film tensioning function.

The wiper 70 can be formed of a wide variety of materials including felt, urethane, silicon, rubber or a composite material including cloth or another fabric. The wiper 70 should be relatively soft and resilient so that it does not mark the adhesive film 16 as it is applied and so that it readily conforms to the shape of the article to which the adhesive film 60 is to be applied. The wiper 70 should be replaceably mounted to in the wiping head 18 so that it can be renewed if it becomes worn, or if dirt or other debris collects on the wiper 70 that could scratch or tear the adhesive film.

Referring now to FIGS. 12 a–d, second film locator clip is generally indicated by reference numeral 14. The second film locator clip 14 is connected to the fixture 10 by bracket 56. Moveable plate 52 carries the pins 54 that receive the film 16. Tension is applied by means of the piston pins 82 that are contained within the chambers 84. Piston pins 82 contact pin stops 96 that are fixedly secured to the stationary 98 that is secured to the bracket 56. The chamber 84 is a closed chamber into which compressed air is provided. The compressed air exerts force on the pins 82 to drive them in the direction of the pin stops 96 that in actuality cause the moveable plate 52 to move away from the pin stops 96. A track 58 is received within a slot formed in the side of the moveable 52 facing the stationary plate 98. The movement of the movable plate 52 is guided on the track 58 in response to forces applied by the adhesive film 16 and the piston pins 82. As shown in FIG. 12a, the film locator clip 14 is shown generally fully assembled. In FIG. 12b a portion of the movable plate 52 is shown removed to reveal the piston pin 82 and chamber 84. As shown in FIG. 12c, more of the movable plate 52 is removed to reveal the structure of the track 58. Referring to 12d, the second film locator clip 14 is shown with the movable plate 52 removed in its entirety to reveal the piston pins 82 and pin stops 96 as they would be held by the moveable plate 52.

While several embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for applying adhesive film to an article comprising:
    a fixture;
    at least one clamp mounted on the fixture for temporarily securing the fixture to the article at a predetermined location on the article;
    first and second film locator clips mounted on the fixture to which the adhesive film is attached, at least one of the film locator clips being biased in one direction to apply a tensioning force to the film to hold at least part of the film in a spaced relationship to the article;
    a wiping head mounted for movement relative to the fixture and being shifted to engage the film and cause one portion of the film to be applied to the article, the wiping head being moved from the one portion of the film to another portion of the film to apply the other portion of the film to the article.

2. The apparatus of claim 1 wherein the article is a vehicle and plurality of clamps are provided that engage at least two structural edges of a body part of the vehicle to locate the fixture relative to the body part prior to applying the film to the vehicle.

3. The apparatus of claim 2 wherein the body part is a vehicle door and the clamps are arranged in two sets, one set of the clamps engaging the b-pillar of the door and the other set of clamps engaging the top and bottom sills of a window opening formed in the door.

4. The apparatus of claim 1 wherein the first film locator clip holds a first part of the film stationary as the film is applied to the article.

5. The apparatus of claim 4 wherein the second film locator clip is moveable in response to the wiping head moving from one portion of the film to the other portion of the film while the second film locator clip holds a second part of the film.

6. The apparatus of claim 5 wherein at least one air pressure biased member is provided as part of the second film locator clip and a source of air pressure is provided to the air pressure biased member.

7. The apparatus of claim 6 wherein the air pressure biased member is a pair of piston pins disposed within a housing having a pair of bores that partially receive the pair of piston pins and the source of air pressure is an air compressor connected by tubing to a fitting on the housing.

8. The apparatus of claim 1 wherein the wiping head is mounted for movement along the film on a carriage that moves along a track aligned with the direction that the carriage moves on the track.

9. The apparatus of claim 8 wherein the wiping head is secured to a cylinder drive mechanism that shifts the wiping head to engage the film and press the film into engagement with the article.

10. The apparatus of claim 9 wherein the wiping head is moved normal to the surface of the article to which the film is to be applied.

11. A method of applying decorative film having an adhesive coating to an article in a predetermined location on a surface comprising:
    locating a fixture on the article;
    attaching a film segment to a first clip;
    attaching the film segment to a second clip that is opposite to the first clip;
    applying a biasing force to the film segment that causes a tension to be applied to the film by the first and second clips that prevents the film from sagging toward the article;
    moving a wiper in a first direction into the film and causing a first portion of the film to contact the article and causing the adhesive to adhere the first portion of the film to the article; and
    moving the wiper in a second direction along the film segment to cause additional portions of the film to contact the article and causing the adhesive to adhere the additional portions of the film to the article.

12. The method of claim 11 wherein the step of applying a biasing force is performed by providing as part of the second clip a dynamic mechanism for pulling on one end of the film segment.

13. The method of claim 11 wherein the step of applying a biasing force is performed by providing a slide that moves the second clip, the slide being attached to a track that is attached to the fixture.

14. The method of claim 13 wherein the biasing force is developed by an air spring operating between the track and the slide.

15. The method of claim 13 wherein the biasing force is developed by a spring operating between the track and the slide.

16. The method of claim 11 wherein the step of locating the fixture on the article is performed by attaching opposed clamping members to the article.

17. The method of claim 16 wherein the clamping members clamp the fixture to the article in alignment with a reference line on the article that defines the predetermined location where the film is to be applied.

18. The method of claim 11 wherein the step of moving the wiper in a first direction is performed by mounting the wiper on the fixture on a linear motor that advances and retracts the wiper relative to the film.

19. The method of claim 18 wherein the linear motor is an air cylinder.

20. The method of claim 18 wherein the linear motor is a rack and pinion gear set.

21. The method of claim 11 wherein the film is held between the first and second clips and is initially bent into an angular shape when the wiper causes the film to contact the article and wherein the wiper makes a line of contact with the article.

22. The method of claim 21 wherein as the wiper is moved toward the second clip and away from the first clip, additional portions of the film are adhered to the article by advancing in a longitudinal direction with the wiper maintaining a line of contact with the article and with the angle of the film relative to the line of contact and the second clip increasing as the wiper is advanced.

* * * * *